March 31, 1959 — R. A. CRESSWELL — 2,880,302
ELECTRIC ARC WELDING
Filed Aug. 8, 1955
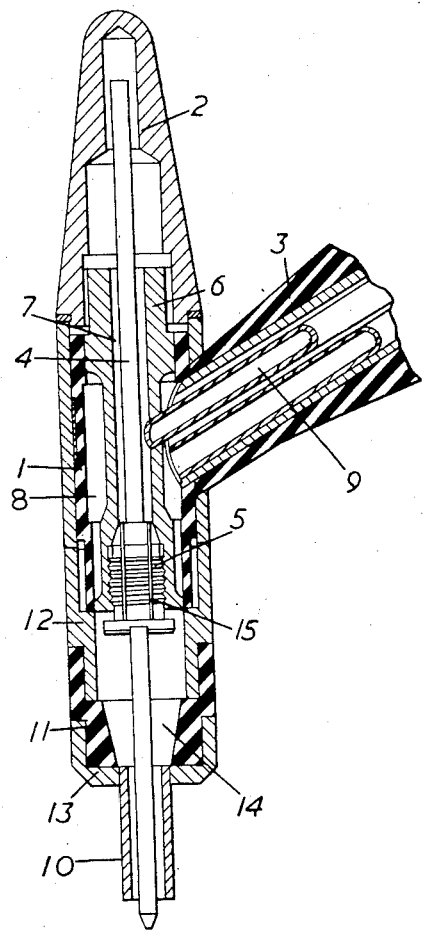
Inventor
ROBERT ARTHUR CRESSWELL
By
Attorney

United States Patent Office 2,880,302
Patented Mar. 31, 1959

2,880,302

ELECTRIC ARC WELDING

Robert Arthur Cresswell, London, England, assignor to The British Oxygen Company Limited, London, England, a British company Application August 8, 1955, Serial No. 527,093

1 Claim. (Cl. 219—74)

This invention relates to inert gas shielded electric arc welding either with a non-consumable electrode, such as, for example, a tungsten electrode, and more particularly to a method of and means for obtaining more efficient and economical gas shielding.

Experiments using smoke as a tracer and shadow and Schlieren photographs have shown that an air gap caused by uprising hot air tends to persist between the gas shroud and the surface of the work pieces. The presence of this gap naturally leads to a decrease in the shielding efficiency of the inert gas.

It is an object of the invention to provide a method of and means for inert gas shielded arc welding in which this air gap is minimised and more efficient gas shielding obtained, thus permitting an improvement in weld quality for the same gas flow or an economy in shielding gas due to an increased length of weld per cubic foot of gas used.

It has now been found that this object can be achieved by increasing the velocity of the shielding gas whilst maintaining the rate of gas flow at its normal value.

According to one aspect of the present invention, therefore, a method of inert gas shielded arc welding comprises maintaining an arc between the work piece and an electrode and feeding an inert gas to the welding zone at a velocity between 20 and 75 feet per second at a gas flow rate between 6 and 30 cubic feet per hour.

The effect of using an increased gas velocity in accordance with the invention is to assist welding by breaking down the air gap between gas shroud and work piece. Above a critical gas velocity (approximately 75 feet per second), however, entrainment of air is caused by turbulence as the gas hits the work piece and arc stability is also affected by too rapid removal of ionised gases and tungsten or other metal vapour from the arc zone.

According to a further aspect of the invention, apparatus for inert gas shielded arc welding comprises a welding torch having a nozzle surrounding the electrode and means for passing a stream of shielding gas through the nozzle to the welding zone, the dimensions of the nozzle being such as to give a gas velocity between 20 and 75 feet per second and a Reynolds number of less than 2500 at a gas flow rate of between 6 and 30 cubic feet per hour.

The nozzle may be of any construction having the necessary dimensions, but a particularly useful form is the thin-walled tubular nozzle which is shown in the accompanying drawing, which shows in longitudinal cross-section one form of apparatus in accordance with the invention.

The torch comprises an insulated tubular body portion 1 provided with an insulated cap 2 and with an insulated handle, shown in part at 3. A non-consumable electrode 4 is slidably mounted within the body 1 by means of a collet-type holder 5 screwed into an annular metal sleeve 6 surrounding the electrode and defining therewith an annular space 7. The outer surface of the sleeve 6 is so shaped as to define a closed outer annular space 8 with the inner wall of the body 1.

The handle 3 is provided with a conduit 9 adapted to be connected at one end to a source of shielding gas and opening at the other end into the annular space 7 surrounding the electrode 4. The handle is also provided with conduits for the passage of cooling water through the outer annular space 8 and with means for conveying welding current to the holder 5 and thence to the electrode 4.

The electrode 4 is surrounded at its end by a straight-walled tubular nozzle 10 of thin heat-resisting material and of small diameter relative to that of the body 1. The nozzle is insulated from the torch body 1 by means of an annular spacing member 11 made of heat and electrically insulating material and screwed on to the end 12 of the body 1. The nozzle 10 is flanged and fixed to the spacing member 11 by means of a threaded metal ring 13, screwing on to the spacing member 11. Thus, the nozzle can readily be replaced in the event of its damage by excessive heat or spatter.

Communication between the annular space 7 and the space 14 surrounding the electrode at the nozzle end of the body 1 is afforded by passages 15 in the holder 5.

In operation, when the flow of shielding gas is started, the gas entering through the conduit 9 passes into the annular space 7 and thence through the passages 15 into the space 14 and thence through the nozzle 10 to the arc zone.

For each particular diameter of electrode used and for a predetermined gas flow within the range of 6 to 40 cubic feet per hour, a nozzle is used of internal diameter such that the velocity of the gas stream issuing from the nozzle has a velocity of between 20 and 75 feet per second and a Reynolds number of less than 2500. For example, for an electrode of $3/32$ inch diameter and a gas flow of 6–14 cubic feet per hour, a nozzle of $5/16$ inch internal diameter gave an issuing gas stream having the required characteristic.

Owing to the small diameter of the nozzle 10, the operator's view of the work is increased and welding in corners and like confined spaces is facilitated.

We claim:

In a method of electric arc welding in which an arc is maintained between a workpiece and a non-consumable electrode, and a stream of inert gas for shielding the welding zone is fed along and in continuous contact with the electrode through a nozzle which surrounds the electrode, the improvement which consists in feeding the inert gas through the nozzle at a velocity of between 20 and 75 feet per second at a gas flow rate of between 6 and 30 cubic feet per hour.

References Cited in the file of this patent

UNITED STATES PATENTS

| | | |
|---|---|---|
| 2,544,711 | Mikhalapov | Mar. 13, 1951 |
| 2,612,584 | Morrissey | Sept. 30, 1952 |